US008550438B2

(12) United States Patent
Cilliers (10) Patent No.: US 8,550,438 B2
(45) Date of Patent: Oct. 8, 2013

(54) PORTABLE WINCH ASSEMBLY

(76) Inventor: Jacobus Hendrik Cilliers, Birmingham (GB)

(*) Notice: Subject to any disclaimer, the term of this patent is extended or adjusted under 35 U.S.C. 154(b) by 166 days.

(21) Appl. No.: 13/144,801

(22) PCT Filed: Jan. 18, 2010

(86) PCT No.: PCT/GB2010/050069
§ 371 (c)(1),
(2), (4) Date: Jul. 15, 2011

(87) PCT Pub. No.: WO2010/084340
PCT Pub. Date: Jul. 29, 2010

(65) Prior Publication Data
US 2011/0272653 A1    Nov. 10, 2011

(30) Foreign Application Priority Data
Jan. 21, 2009    (GB) .................................. 0900944.0

(51) Int. Cl.
*B66D 1/14* (2006.01)
(52) U.S. Cl.
USPC ........................................................ 254/342
(58) Field of Classification Search
USPC ................ 254/4 R, 97, 103, 106, 278–280, 254/290, 323, 324, 325, 334, 339, 342
See application file for complete search history.

(56) References Cited

U.S. PATENT DOCUMENTS 1,395,735 A * 11/1921 Sawyer .......................... 254/290
3,776,515 A   12/1973 Bergeron
3,836,122 A    9/1974 Pierce
2006/0056919 A1 * 3/2006 Tjader ......................... 405/184.3

FOREIGN PATENT DOCUMENTS

EP    0057601    8/1982

OTHER PUBLICATIONS

PCT International Search Report and the Written Opinion, PCT/GB2010/050069, Jan. 20, 2011.

* cited by examiner

*Primary Examiner* — Emmanuel M Marcelo
*Assistant Examiner* — Angela Caligiuri
(74) *Attorney, Agent, or Firm* — Pedersen and Company, PLLC; Ken J. Pedersen; Barbara S. Pedersen (57) ABSTRACT

This invention relates to a portable winch assembly (10; 210) comprising a footplate (12; 212), a support frame (14; 214) which is locatable upon the footplate, a magazine (16; 216) which is locatable upon the support frame, and a drive mechanism (22; 222) which is connectable to the magazine to drive the magazine to rotate. The foot plate, support frame, magazine and drive mechanism comprise separable components which may be transported separately to a site of use and assembled into the winch at the site of use. The invention can provide a portable winch assembly capable of generating a tensile force of up to 10 tonnes, and is therefore suitable for pipe pulling and pipe bursting applications for example, and yet is made up of parts which can readily be carried to the site of use, which site of use may be inaccessible for vehicles.

15 Claims, 12 Drawing Sheets

PORTABLE WINCH ASSEMBLY

FIELD OF THE INVENTION

This invention relates to a portable winch assembly. The portable winch assembly is likely to find its greatest utility in relation to the splitting or bursting of underground pipes, or the removal of underground pipes, and the following description relates primarily to such applications. The invention is not however limited to those applications.

In this specification, directional and orientational terms such as "top", "bottom", "below" etc., refer to the components of the winch assembly in their normal orientation of use, as shown for example in FIG. 1.

BACKGROUND OF THE INVENTION

Water and gas are supplied to domestic and commercial properties by way of large underground (mains) pipes which are laid by the utility suppliers. Smaller pipes connect the mains pipe to the individual building or dwelling. To enable the water or gas supply to be cut off from a particular building (in the event of a leak upon that property), the smaller pipes contain a valve or stopcock, the stopcock usually being located (underground) at the edge of the user's property, for example at the end of the driveway serving the property. Access to the stopcock is provided by way of an access hole.

Waste water is removed from domestic and commercial properties by way of underground waste water pipes, the waste water pipes forming a network joining each property to a waste water treatment facility. Access holes are provided at intervals along the pipe, the larger access holes (for the larger pipes) being manholes which are large enough to accommodate a person.

It is periodically necessary to replace an underground pipe, for example a pipe providing water to the property may become insufficient if the water consumption for the property grows beyond the capacity of the pipe. Also, a water or gas supply pipe, or a waste water pipe, may become damaged and start to leak, and so require replacement. In addition, it may be necessary to pass a cleaning tool along a pipe, for example to remove limescale encrustation within a waste water pipe.

DESCRIPTION OF THE PRIOR ART

One method of replacing an existing pipe is to dig a trench along the line of the pipe and to remove the existing pipe and replace it with a new pipe by way of the trench. Clearly, digging a trench is an expensive and time-consuming activity, and can result in damage to the property and/or to a garden or roadway under which the existing pipe passes.

To avoid the requirement to dig a trench, several trenchless methods of replacing an existing pipe have been developed. In all of these methods it is first necessary to locate the ends of the pipe to be replaced. For example, with a waste water pipe the length of pipe which is to be replaced is identified and an access hole is excavated adjacent to each end (or an existing access hole is used). The pipe is cut so as to open the ends of the length of pipe which is to be replaced. A cable is then passed along the pipe from a first end to the second end. When the cable reaches the second end of the pipe it is secured to a "pipe burster" or "pipe splitter". The pipe burster is also secured to the end of the replacement pipe.

The burster or splitter is a tool which has a tapered leading end and a central portion which is larger than the inside diameter of the existing pipe. The exact form of the splitter will depend upon the material of the existing pipe, but it can for example include a blade to cut open the existing pipe.

A trench around three meters long is excavated adjacent to the first end of the pipe, and the pipe bursting equipment is located in the trench. The cable is connected to the pipe bursting equipment, and is thereby pulled through the pipe, in turn pulling the pipe burster. The existing pipe is thereby progressively burst as the pipe burster passes therealong, and at the same time is replaced by the replacement pipe.

The requirement to excavate a trench for the pipe bursting equipment avoids much of the advantage of a trenchless method of replacing the pipe. In addition, for an approx. 10 cm diameter waste water pipe made of ceramic or plastics material, the pipe bursting equipment must typically be able to impart a tensile force of around 10 tonnes upon the cable. Such pipe bursting equipment is therefore heavy and cumbersome, and must be transported to the site of use on a vehicle, so that a roadway or the like is required.

It is also known, especially for the replacement of smaller pipes, to pull the cable by way of a winch mechanism located above the ground. Specifically, a winch mechanism is located on a trailer and the trailer is manoeuvred over the access hole at the first end of the pipe. The use of a trailer-mounted winch reduces the excavation required. However, such a winch can again only be used in applications where the pipe to be replaced can be accessed by a roadway or the like along which the trailer can be moved.

In my copending international patent application WO2008/071997 there is described another trenchless method of replacing an existing pipe. In that method, a portable winch is used, the winch having a pulley which can be located in the access hole adjacent to the first end of the pipe, the remainder of the winch mechanism being located aboveground and thereby avoiding or reducing additional excavation.

The present invention is directed to the detailed construction of a winch which is suitable for use in the method of WO2008/071997, and which can also be used in other pipe replacement methods as well as other applications requiring a portable winch.

SUMMARY OF THE INVENTION

It is an object of the present invention to provide a portable winch assembly which can readily be carried to the site of use, so that a trailer (and therefore an access roadway or the like) is not required.

It is another object of the invention to provide a portable winch assembly which is capable of providing a tensile force of up to 10 tonnes.

Typically, a winch which is capable of providing such a large force would be much too heavy to be portable, and would require a trailer or some other vehicle as described above. However, the inventor has realised that a suitable winch can be provided as an assembly of smaller and lighter parts, each of which can be carried to the site of use where the winch can be assembled.

It is expected that the separate parts of the winch assembly will be transported (disassembled) in the user's vehicle, and if a roadway to the site of use is available the operator may not have to carry the separate parts of the winch assembly more than a few meters. However, if the site of use is more remote or less accessible, the winch assembly has been designed so that the operator can carry the separate parts to the site of use if that is required, and assembly the winch at the site of use. Alternatively, the parts of the winch assembly can be designed to fit (disassembled) onto a purpose-built trolley for transporting to and from the site of use.

According to the invention, there is provided a portable winch assembly comprising a foot plate, a support frame which is locatable upon the footplate, a magazine which is locatable upon the support frame, and a drive mechanism which is connectable to the magazine to drive the magazine to rotate.

Preferably, the footplate has at least one pulley. In a desired method of use for replacing a length of underground pipe the footplate is located within an access hole so that the pulley is adjacent to the (first) end of the pipe, and the cable or the like which is connected to the pipe burster passes from the pipe to the magazine by way of the pulley. The support frame projects from the hole so that the magazine and drive mechanism are located above ground. This has the advantage that the moving mechanical parts are not in the hole where they can become damaged, and also are more easily accessible. This has another advantage in that a full magazine is at a height where it can more easily be removed from the winch assembly.

Preferably also the footplate has a recess to receive a part of the support frame. Ideally, the support frame is mounted upon the footplate by locating the part of the support frame in the recess, the cooperating recess and part of the support frame being configured so that when the winch assembly is not in use the mounting can be maintained by gravity without any fixing means. The avoidance of fixing means reduces the complexity of the winch components, and expedites assembly and disassembly of the winch.

In some embodiments, the bottom of the recess in the footplate is located below the axle of the pulley, and ideally below the bottom of the pulley. This helps to ensure that tension in a cable which engages the pulley acts to push the support frame into the recess, rather than acting to tip the support frame out of the recess.

Desirably, the magazine is connected to a drive mechanism which is in turn mounted upon the support frame. In some embodiments the drive mechanism includes a pair of drive rollers.

In alternative embodiments, the drive mechanism includes a gear wheel which can be driven to rotate by two motors. Ideally the motors are substantially diametrically opposed relative to the gear wheel. Desirably, the gear wheel is connected to the magazine by way of a spider mechanism, the spider mechanism preferably permitting relative radial movement between the gear wheel and the magazine. The permitted radial movement can accommodate stresses and wear which occur during use of the winch assembly.

Desirably, the magazine is mounted upon the support frame by resting a part of the magazine upon a part of the drive mechanism, the drive mechanism in turn being rested upon the support frame. The mounting of the magazine upon the drive mechanism and support frame is desirably maintained by gravity without any fixing means. In embodiments in which the drive mechanism has drive rollers, desirably the drive rollers are mounted upon the support frame by resting a part of the drive rollers upon guide rollers of the support frame, and the magazine is mounted upon the drive rollers by resting a part of the magazine against a part of the drive rollers. The arrangement of magazine, support frame and drive rollers (when present) is such that, when the winch assembly is not in use, the mounting of the magazine upon the support frame can be maintained by gravity without any fixing means. The avoidance of fixing means for the magazine (and also for the drive rollers if present) reduces the complexity of the winch components, and expedites assembly and disassembly of the winch.

When the winch assembly is in use, it is arranged that tension in a cable between the footplate and the magazine helps to secure the support frame in position upon the footplate, and helps to secure the magazine in position relative to the support frame, in addition to the force of gravity.

Preferably, in the assembled winch the axis of rotation of the magazine is perpendicular to the axis of rotation of the pulley of the footplate. This helps to ensure that unbalanced forces acting upon the magazine during the winching operation can be better resisted by the support frame and footplate, and are less likely to cause the support frame to pivot about the axis of the pulley.

BRIEF DESCRIPTION OF THE PREFERRED EMBODIMENTS

The invention will now be described in more detail, by way of example, with reference to the accompanying drawings, in which.

DETAILED DESCRIPTION

Figure 1:
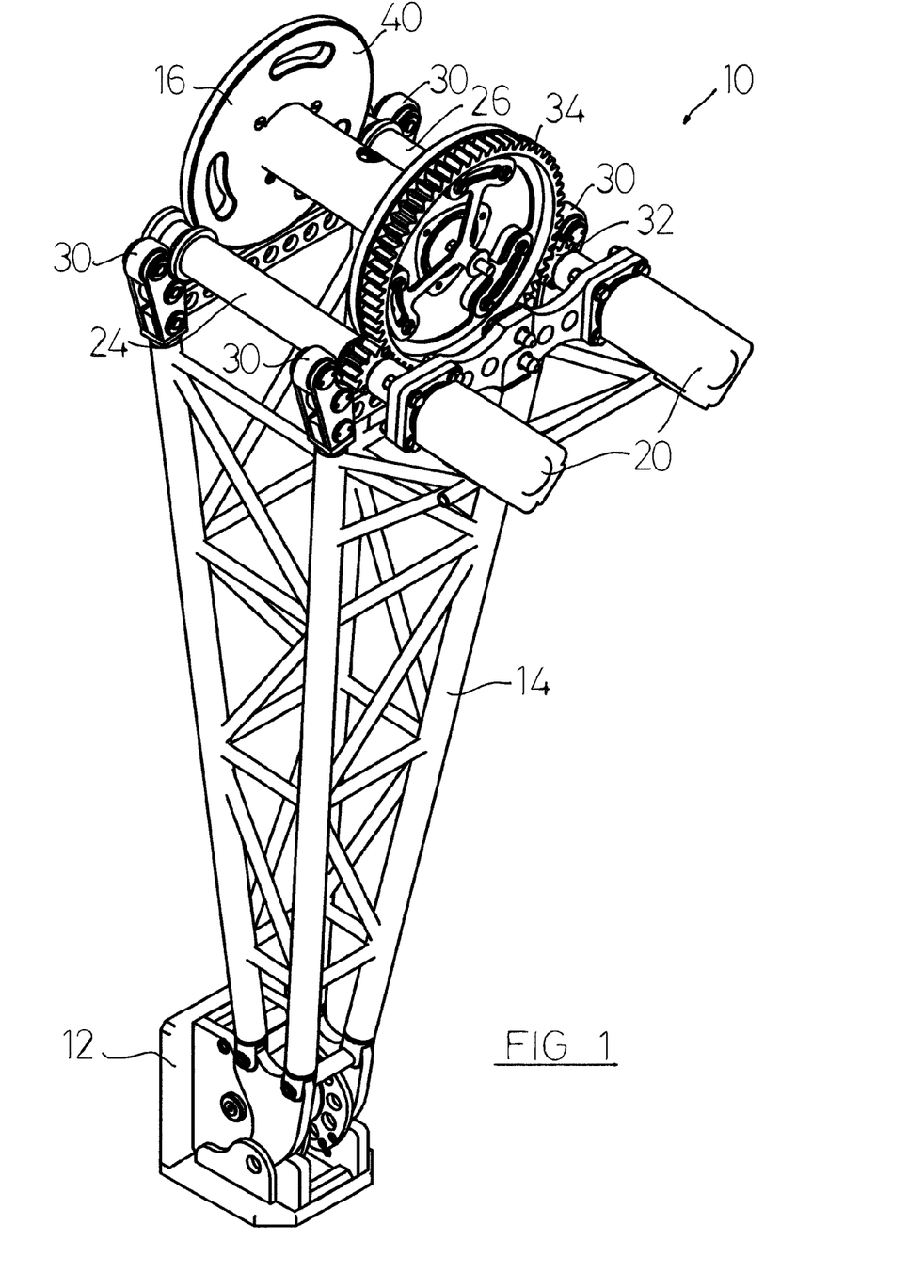
FIG. 1 is a perspective view of a portable winch assembly according to a first embodiment of the present invention.
Figure 5:
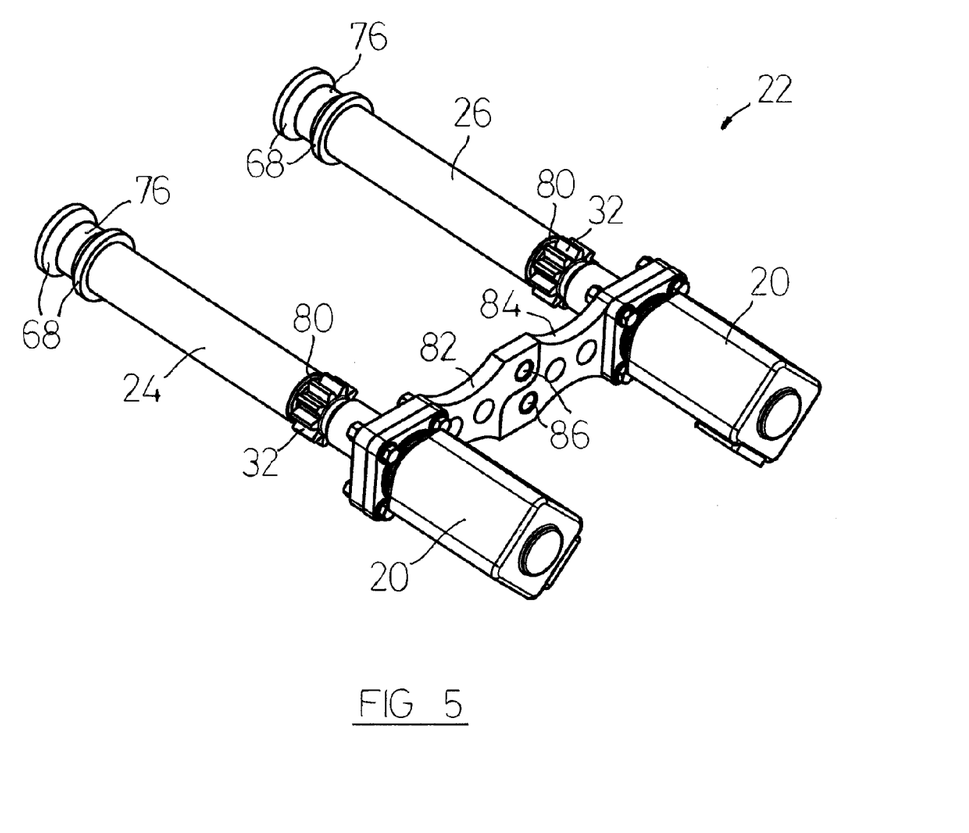
FIG. 5 is a perspective view of the drive mechanism of the first embodiment.

The winch assembly 10 shown in FIG. 1 comprises a footplate 12, a support frame 14, a magazine 16, and a drive mechanism 22 (FIG. 5). The drive mechanism 22 includes a pair of hydraulic drive motors 20.

In the first embodiment of the invention the drive mechanism 22 is mounted upon the support frame 14 by resting the drive rollers 24, 26 upon the guide rollers 30. The magazine 16 is in turn mounted upon drive rollers 24, 26.

The drive motors 20 cause the drive rollers 24, 26 to rotate (in the same direction). Each of the drive rollers 24, 26 carries a respective drive gear 32 which engage a gear wheel 34. The gear wheel 34 has three lugs (not seen), each of which locates into a respective opening 36 (FIG. 6) in the end wall 40 of the magazine 16.

Figure 2:
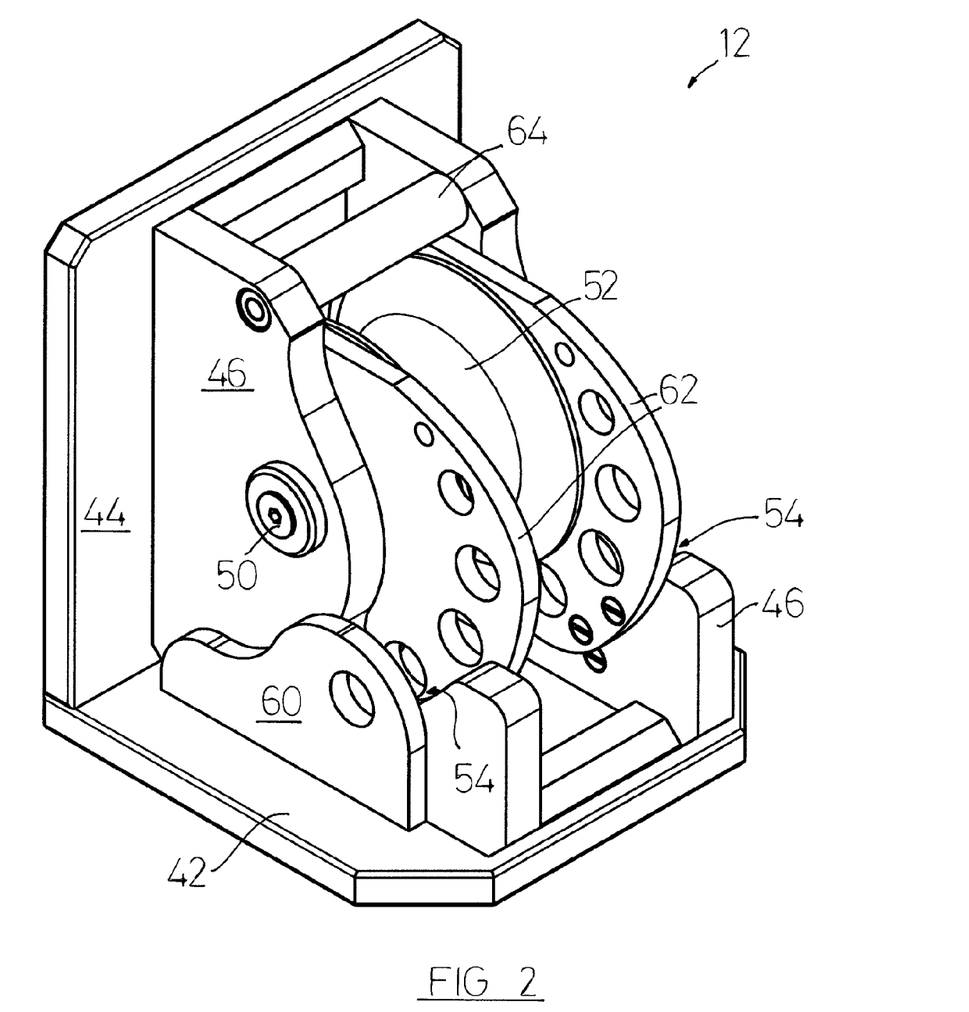
FIG. 2 is a perspective view of the footplate of the first embodiment from above.
Figure 3:
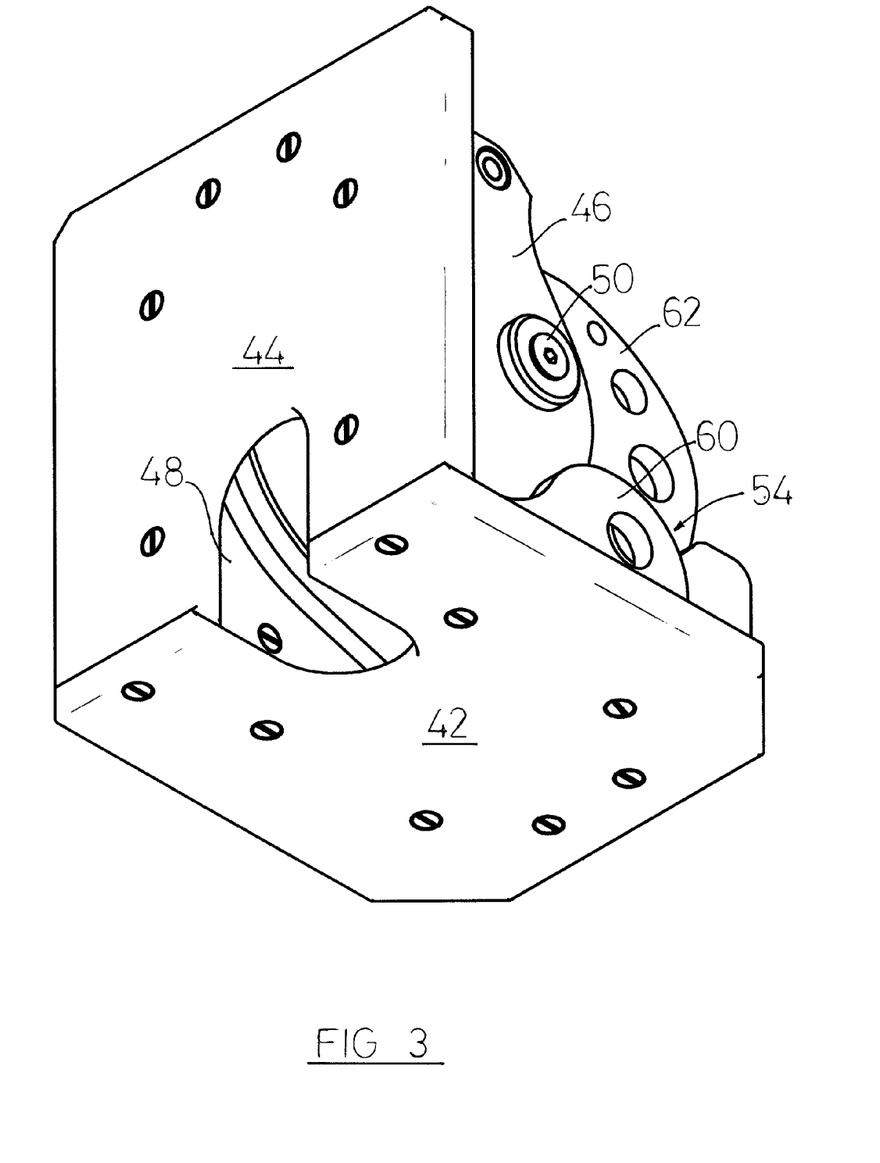
FIG. 3 is a perspective view of the footplate of FIG. 2 from below.

The footplate 12 of the first embodiment is shown in more detail in FIGS. 2 and 3. The footplate 12 comprises a substantially flat bottom plate 42 and a substantially flat back plate 44, the back plate 44 being substantially perpendicular to the bottom plate 42. A pair of side plates 46 are rigidly connected (suitably by screws as shown in FIG. 3) to the bottom plate 42 and the back plate 44, and each of the side plates 46 mounts an end of an axle 50 of a pulley 52. The back plate 44 (and in this embodiment also the bottom plate 42) has an aperture 48 through which the cable may be passed in use.

Each of the side plates 46 is shaped to provide a recess 54, which recess is shaped to accommodate one of the two bottom ends 56 (FIG. 4) of the support frame 14. The recesses 54 are flanked by additional plates 60, 62, which facilitate location of the bottom ends 56 in the recesses 54, and also protect the pulley 52. The additional plates 60, 62 are apertured so as to reduce weight, although in other embodiments an aligned pair of apertures could be used to locate a locking pin passing through a corresponding aperture in the bottom ends 56. In this embodiment, however, there are no fixing means for the support frame 14 and footplate 12, and the support frame is mounted upon the footplate merely by locating the bottom ends 56 in the respective recess 54.

The footplate 12 is designed to be relatively compact, so that it may be located in a relatively small access hole (not shown) adjacent to the (first) end of a pipe (also not shown), with the bottom plate 42 resting upon the ground at the bottom of the access hole. The footplate 12 may be small enough to be located within an existing access hole such as that provided for the stopcock, although a (minimum) amount of excavation may be required to allow the footplate 12 to be positioned so that the bottom of the pulley 52 is substantially aligned with the centre of the pipe which is to be replaced.

A pin 64 is mounted between the side plates 46, above the pulley 52, and helps to stabilise the side plates, but it has the additional function as a carrying handle for the footplate 12.

Figure 4:
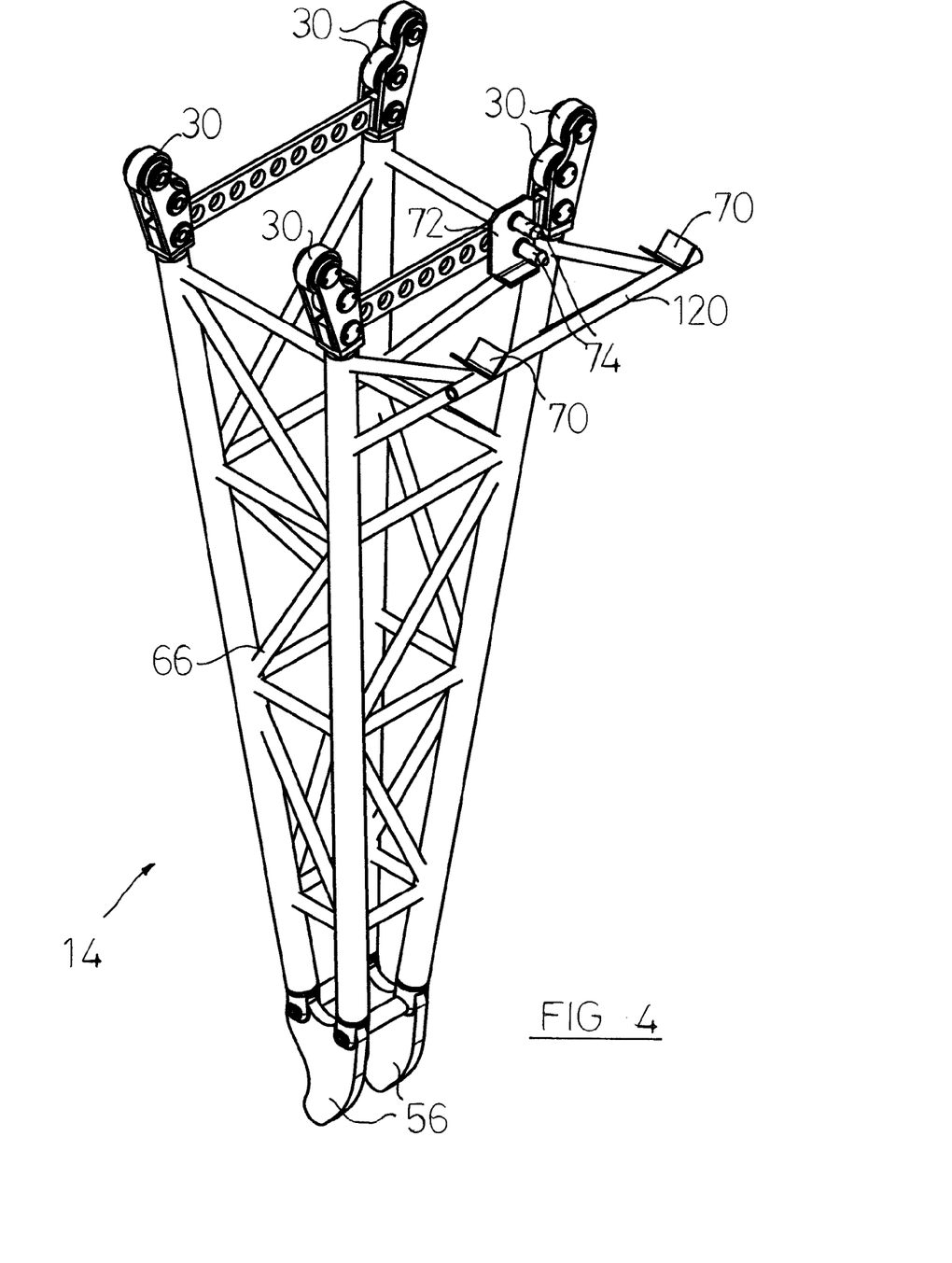
FIG. 4 is a perspective view of the support frame of the first embodiment.

The support frame is better shown in FIG. 4. The bottom ends 56 are both connected to a column 66 comprising a fabricated network of beams. At the top of the column the support frame has four sets of guide rollers 30, a pair of support trays 70, and a backing plate 72 mounting a pair of pins 74.

The drive mechanism is better shown in FIG. 5. The drive mechanism 22 comprises two drive motors 20 and two (substantially identical) drive rollers 24, 26, each of which carries a gear 32. In the portable winch assembly as shown in FIG. 1 the end walls 40 of the magazine 16 lie upon the surface of each of the drive rollers 24, 26. To locate the magazine 16 a part 76 of the surface of each of the drive rollers 24, 26 is defined by respective tapering flanges 68, the spacing between the flanges 68 closely matching the thickness of the end plate 40. As will be seen from FIG. 1, the part 76 of each of the drive rollers 24, 26 also engages respective guide rollers 30 on the support frame 14, so that the flanges 68 serve to locate the drive mechanism 22 relative to the support frame 14, and also serve to locate the magazine 16 relative to the drive mechanism 22.

The spacing between the part 76 and the drive gear 32 on each of the drive rollers 24, 26 is determined so that when one of the end plates 40 of the magazine 16 engages the part 76 the gear wheel 34 carried by the other end plate 40 will engage the drive gear 32, as is shown in FIG. 1.

It will be seen from FIG. 1 that the periphery of the teeth of the gear wheel 34 project slightly beyond the periphery of the end plate 40. An annular groove 80 is formed in the drive rollers 24, 26 adjacent to the gear 32, so as to prevent the teeth engaging the surface of the drive roller.

The drive rollers 24, 26 are each rotatably mounted in a respective support plate 82, 84, the support plates carrying the respective drive motors 20. The drive motors 20 in this embodiment are hydraulic drive motors and are driven by a hydraulic power pack (not shown), in known fashion. Actuation of the hydraulic drive motors causes the drive rollers 24, 26 to rotate (in the same direction). Any suitable drive means may be used, and the two motors 20 could be replaced by a single motor (or a set of three or more cooperating motors), if desired. However, two hydraulic drive motors 20, with suitable gearing provided by the gears 32 and the gear wheel 34, are desired.

FIG. 5 represents the drive mechanism 22 as a single component, and some embodiments could be made in that way (with for example a single support plate replacing the separate support plates 82, 84). In the present embodiment the support plate 82 is separable from the support plate 84, so that the drive mechanism can be separated into two substantially equal parts, for ease of transportation and to enhance portability.

To assemble the drive mechanism 22 to the support frame 14, the drive motors 20 are placed upon the support trays 70, with the holes 86 in the support plates 82, 84 are aligned with the pins 74. The drive mechanism 22 is moved relative to the support frame 14 so as to insert the pins 74 into the holes 86, the pins 74 being secured in their relative positions by the backing plate 72, and thereby securing the support plates 82, 84 (and the drive mechanism 22) together.

It is arranged that when the support plates 82, 84 engage the backing plate 72, the parts 76 of the rollers 24, 26 engage the guide rollers 30 of the support frame (see FIG. 1).

Figure 6:
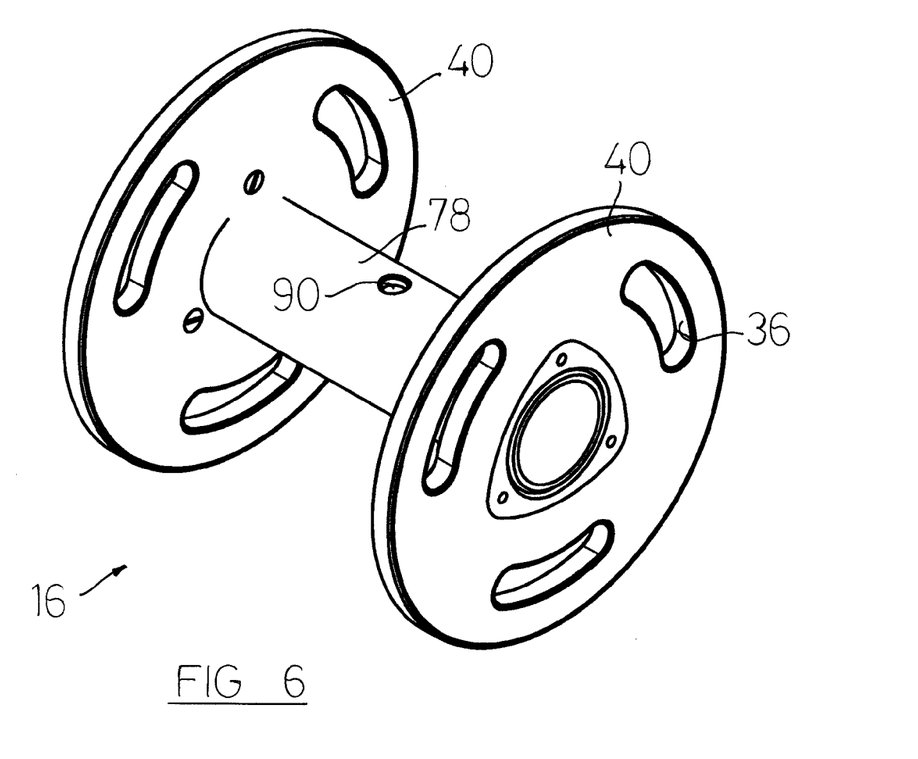
FIG. 6 is a perspective view of the magazine of the first embodiment.
Figure 7:
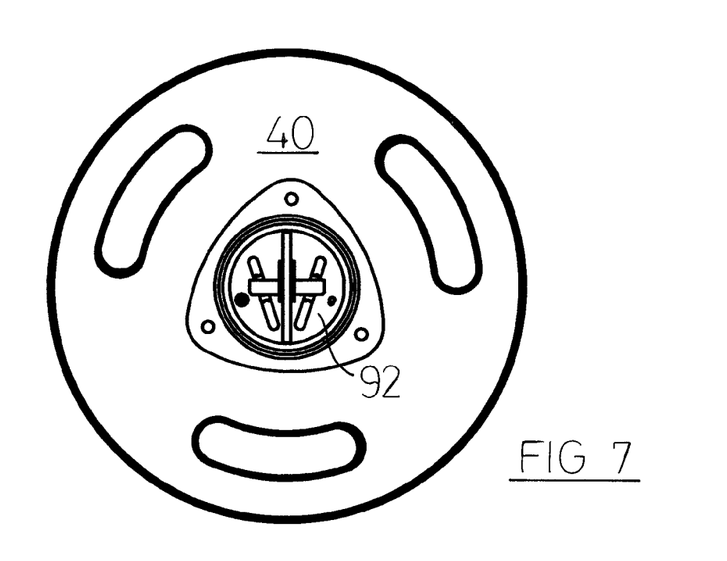
FIG. 7 is a side view of the magazine of FIG. 6.

The first embodiment of magazine 16 is shown in more detail in FIGS. 6 and 7. The magazine 16 comprises a central cylindrical shaft 78 and two end plates 40. Each of the end plates 40 has three openings 36 therethrough. The first function of the openings 36 is to accept the three lugs (not shown) of the gear wheel 34 as previously described, the lugs being a sliding fit into the openings so that when the assembly is under tension the gear wheel 34 and the magazine are effectively secured together. The second function of the openings 36 is as a carrying handle for the magazine. The magazine itself is ideally substantially symmetrical as shown, and only becomes "handed" once the gear wheel 34 has been fitted to one or the other end plate 40.

In the assembled winch, the end plate 40 to which the gear wheel 34 is attached engages the rollers 24 and 26 adjacent to the respective groove 80, and the other end plate 40 engages the parts 76 of the rollers 24 and 26. The gear wheel 34 engages the gears 32. As the rollers 24, 26 are driven to rotate, the magazine 16 is also driven to rotate, mainly by the gears 32, gear wheel 34 and the lugs of the gear wheel engaging the openings 36 in one of the end plates 40, but also by the friction between the drive rollers 24, 26 and the end plates 40.

It is a feature of this embodiment that the drive gears 32 alone do not need to provide all of the force required to provide a tensile load of 10 tonnes into a cable wound about the magazine. The magazine 16 is also driven to rotate by the drive rollers 24 and 26 engaging the end plates 40. The effective radius of the drive gears 32 is the same as the radius of the drive rollers 24, 26, and the effective radius of the gear wheel 34 is the same as the radius of the end plates 40, so that the frictional drive of the drive rollers 24, 26 and end plates 40 matches the geared drive. In use, as the tension in a cable wound about the magazine increases, the frictional engagement between the end plates 40 and the drive rollers 24, 26 increases, so that more of the rotational force of the drive motors 20 is transmitted by way of the frictional drive. This has the advantage that only a small proportion of the maximum rotational force of the motors 20 is required to be transmitted by the drive gears 32, so that the drive gears can be of reduced size and therefore reduced weight.

The central cylindrical shaft 78 of the magazine 16 is hollow, and has an opening 90 to receive an end of a cable (not shown). Located within the shaft 78 is a clamping mechanism 92, which is shown in more detail in FIGS. 8 and 9.

Figure 8:
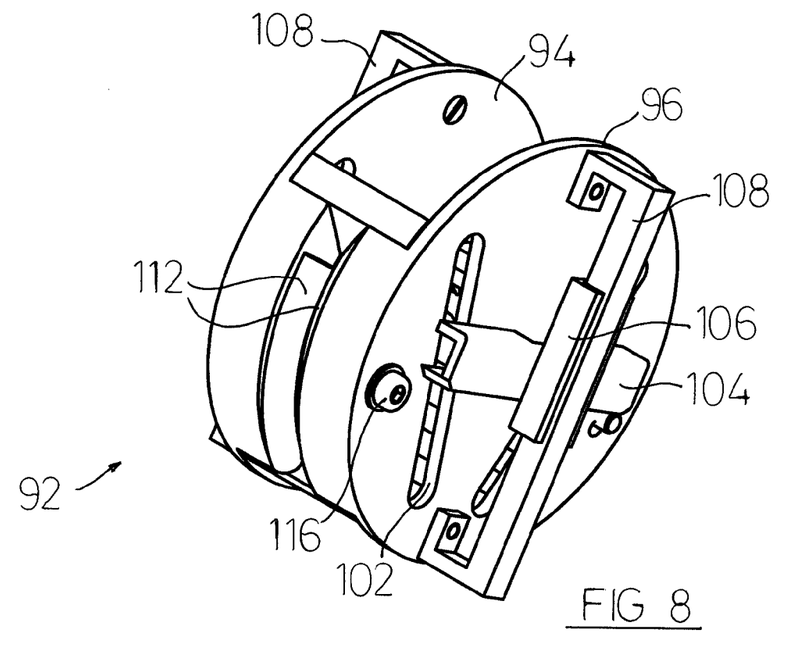
FIG. 8 is a perspective view of the clamp mechanism of the first embodiment.
Figure 9:
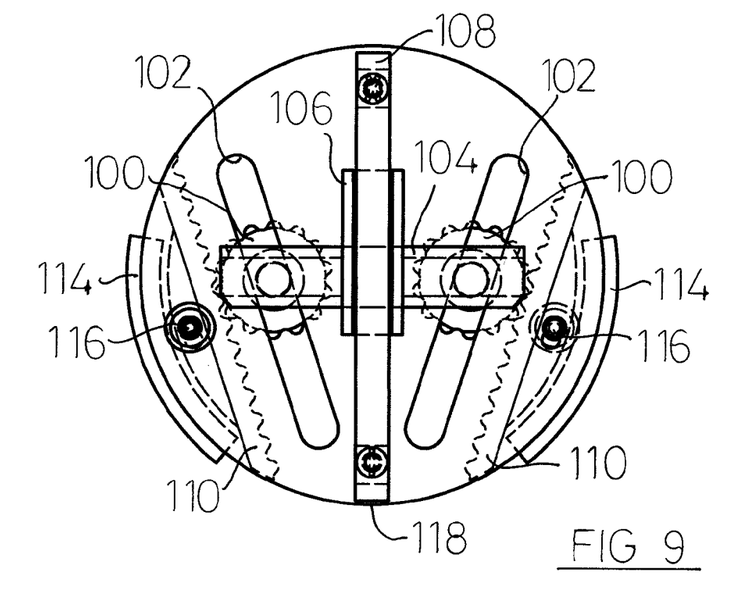
FIG. 9 is a side view of the clamp mechanism of FIG. 8, with some of the internal components shown in dotted outline.

The clamping mechanism 92 comprises two face plates 94 and 96 which are substantially mirror-images of each other. Between the face plates 94, 96 are located two clamp wheels 100. The axle of each of the clamp wheels passes through a substantially linear opening 102 in the face plate, and locates in a first channel part 104. The first channel part 104 is connected to a second channel part 106 which is guided to slide along a rail 108, there being a rail 108 fixed to each of the face plates 94, 96.

The clamp wheels 100 have the form of gear wheels with the gears having rounded ends, so as to give the clamp wheels an undulating periphery. Alongside the clamp wheels are a pair of rails 110 with a similarly undulating surface.

The face plates 94, 96 have aligned tapering parts 112, between which can be mounted a bush 114 (the bush 114 is not shown in FIG. 8, but the two bushes 114, each lying between a pair of aligned tapering parts 112, are shown in FIG. 9). The bushes 114 are similarly tapered, with the effect that as the face plates 94 and 96 are moved together (by way of the fixing bolts 116) the bushes 114 are forced outwardly.

The diameter of the face plates 94 and 96 is slightly smaller than the inside diameter of the shaft 78. Accordingly, the clamp mechanism 92 can be assembled, with the face plates 94 and 96 loosely held together by way of the fixing bolts 116, and slid into the shaft 78. When the clamp mechanism 92 has been correctly positioned, with the hole 90 substantially aligned with the point 118 and substantially aligned with the mid-line of the clamp mechanism 92, the fixing bolts 116 can be tightened so as to secure the parts of the clamp mechanism together, and also to drive the bushes 114 into engagement with the inside surface of the shaft, securing the clamp mechanism 92 in place.

The clamp wheels 100 are biased by relatively weak springs (not shown) towards the point 118, i.e. until they engage one another. When the end of a cable (not shown) is passed through the hole 90 it engages the clamp wheels 100. The cable will be sufficiently stiff to allow it to be pushed into the central shaft, overcoming the biasing springs of the clamp wheels 100 and moving the axles of the clamp wheels along the openings 102 until the cable can pass between the clamp wheels. As soon as a short length of the cable has passed between the clamp wheels 100 it will be retained thereby, i.e. attempts to pull the cable out of the hole 90 will be resisted by the clamp wheels 100 being forced together by the converging rails 110.

Once the end of the cable is clamped to the magazine 16, the magazine can be rotated so as to wind the cable onto the magazine.

It will be understood that positioning the clamp mechanism 92 within the central shaft 78 of the magazine 16 protects the clamp mechanism from damage and from the ingress of dirt. The clamp mechanism 92 can be removed by loosening the bolts 116 and sliding it out of the central shaft 78.

The tension which can be provided to the cable will depend upon the components of the portable winch assembly 10. By a suitable choice of materials, drive motors and gearing, a portable winch assembly capable of delivering a tensile force of 10 tonnes can be provided, and yet the winch assembly can be assembled and disassembled very quickly, and all of the components can be carried by hand.

The heaviest component is likely to be the support frame 14. The support frame is nevertheless designed to be carried by one person, but if desired a pair of wheels can be added to the ends of the shaft 120 (FIG. 4), the wheels permitting the user to roll the support frame 14 rather than carry it.

Figure 10:
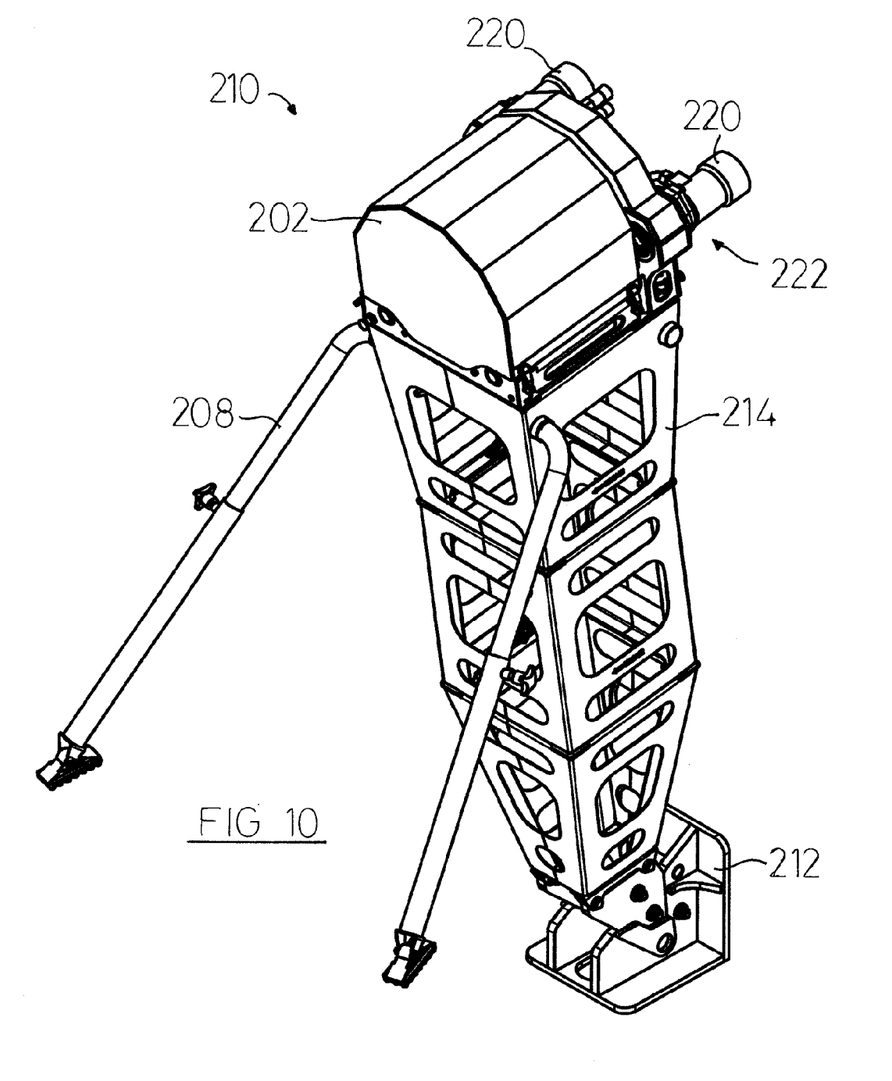
FIG. 10 is a perspective view from the front of a portable winch assembly according to a second embodiment of the present invention.
Figure 11:
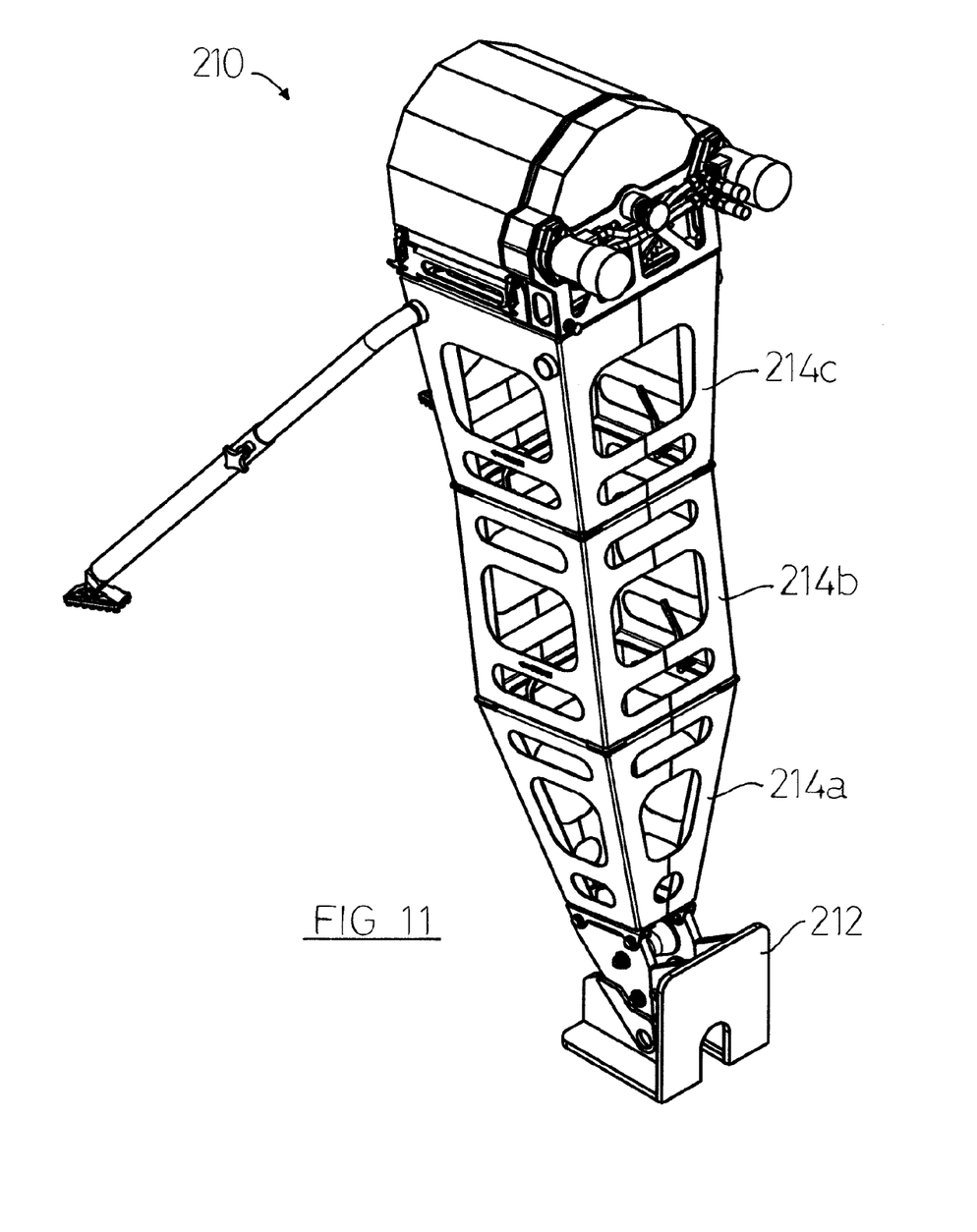
FIG. 11 is a perspective view from the rear of the portable winch assembly of FIG. 10.

It will be understood that the support frame 14 is relatively unstable when first assembled, and one or more bracing pieces can be provided if desired, the bracing pieces being fitted between an upper part of the support frame and the ground adjacent to the access hole (see for example the bracing pieces 208 of the second embodiment shown in FIGS. 10 and 11). The bracing pieces are ideally separable from the support frame, so that they do not increase the weight of the support frame.

In use, however, the support frame 14 is very stable. This stability is provided in part by arranging the bottom of the recess 54 as low as possible, and in some embodiments below the axle 50. Thus, it will be understood that attempts to tip the support frame 14 relative to the footplate 12, namely in the directions towards the top left-hand corner of the sheet or the bottom right-hand corner of the sheet as drawn in FIG. 1, will increase the distance between the pulley 52 and the magazine 16, so that tension in a cable wound about the magazine and pulley will resist any tendency of the support frame to tip over, and will instead act to maintain the support frame 14 in an upright position.

Furthermore, the hook-like shaping of the bottom ends 56, and the corresponding shaping of the recesses 54, mean that the support frame 14 will not tip (towards the top left-hand corner of the sheet or the bottom right-hand corner of the sheet as drawn in FIG. 1) relative to the footplate unless the support frame 14 is first lifted (at least partly) away from the footplate—and tension in the cable opposes such lifting. Thus, the stable location of the footplate 12 in the access hole, perhaps with the back plate 44 lying against a wall of the access hole adjacent to the end of the pipe to be removed, will result in a stable portable winch assembly 10.

It will be noted that the rotational axis of the magazine 16 is perpendicular to the axle 50 of the pulley 52. Since the tensile force in the cable will act to one side of the magazine 16, that force causes one of the bottom ends 56 to be pressed into its recess 54 with greater force than the other bottom end 56. The bottom ends 56 are arranged to be sufficiently far apart to ensure that the tensile force is never sufficiently unbalanced to induce sideways tipping of the support frame 14. This method of mounting the support frame 14 to the footplate 12 makes the winch assembly more stable, particularly when not under load.

A second embodiment of portable winch assembly 210 is shown in FIGS. 10-17. The winch assembly 210 shown in FIGS. 10 and 11 comprises a footplate 212, a support frame 214, a magazine 216 (see FIG. 15), and a drive mechanism 222.

In this second embodiment the magazine 216 is covered in use by a removable magazine cover 202. Also in this second embodiment the support frame 214 is made up of separable, stackable, sections 214a, 214b and 214c. The section 214c may merely rest upon section 214b, and the section 214b may merely rest upon the section 214a, but in this preferred embodiment releasable catches (not shown) are provided to temporarily secure the sections together. The advantage of providing separable sections for the support frame is that the maximum weight of any particular component of the portable winch assembly is reduced, since as above explained the support frame of the first embodiment is likely to be the heaviest single component. In alternative embodiments the support frame may be separable into two, four or more components, as desired.

Figure 12:
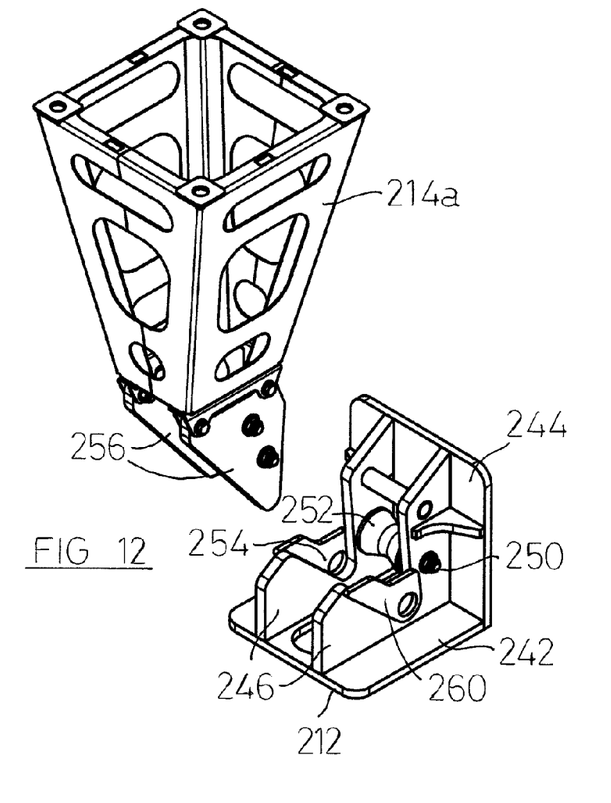
FIG. 12 is a perspective view of the footplate and bottom of the support frame of the second embodiment.
Figure 13:
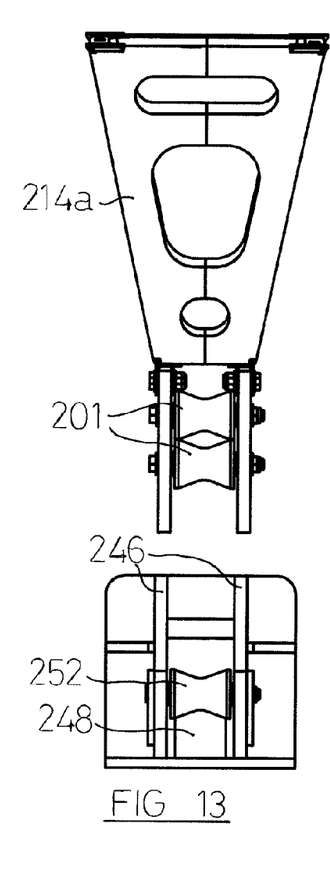
FIG. 13 is a front view of the footplate and bottom of the support frame of the second embodiment.

The footplate 212 of the second embodiment is shown in more detail in FIGS. 12 and 13. The footplate 212 comprises a substantially flat bottom plate 242 and a substantially flat back plate 244, the back plate 244 being substantially perpendicular to the bottom plate 242. A pair of side plates 246 are rigidly connected to the bottom plate 242 and the back plate 244, and each of the side plates 246 mounts an end of an axle 250 of a pulley 252. The back plate 244 has an aperture 248 through which the cable may be passed in use.

Unlike the first embodiment which uses a single pulley 52, the present embodiment has one pulley 252 mounted upon the footplate 212, and two further pulleys 201 mounted upon the support frame 214, or more specifically upon the bottom support frame section 214a. The pulleys 201, 252 are arranged so that in use they provide an arc around which the cable (not shown) may pass, the three pulleys 201, 252 together providing a large radius of curvature for the cable, equivalent to a large pulley, but with far less weight.

Each of the side plates 246 is shaped to provide a recess 254, which recess is shaped to accommodate one of the two bottom ends 256 of the support frame 214. The recesses 254 are flanked by additional plates 260 which facilitate location of the bottom ends 256 in the recesses 254. As in the first embodiment, there are no fixing means between the support frame 214 and footplate 212, and the support frame is mounted upon the footplate merely by locating the bottom ends 256 in the respective recess 254. However, suitable fixing means could be provided if desired.

Figures 14, 15, 16:
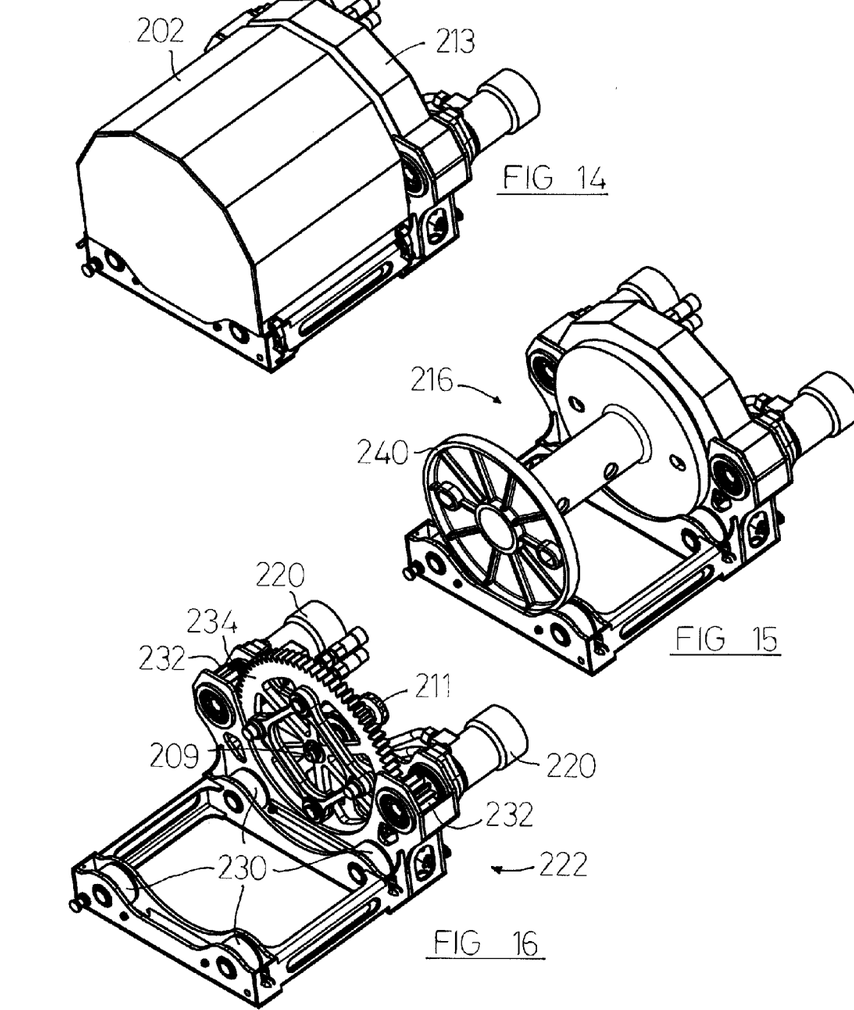
FIG. 14 is a perspective view of the drive mechanism, fitted magazine and magazine cover of the second embodiment.
FIG. 15 is a view as FIG. 14 with the magazine cover removed.
FIG. 16 is a view of the drive mechanism of the second embodiment.

The top of the support frame 214, or more specifically the top of the support frame section 214c, is adapted to locate the drive mechanism 222 as shown in FIG. 16. In this embodiment the drive mechanism 222 incorporates guide rollers 230, and so no guide rollers are needed upon the support frame 214. Instead, the top of the support frame can be substantially flat, for example similar to the top of the support frame section 214a shown in FIG. 12, albeit with means to locate the drive mechanism 222 thereupon. Releasable fixing means can be provided to secure the drive mechanism 222 to the support frame 214 during use if desired.

As shown in FIG. 16, the drive mechanism 222 comprises two drive motors 220, each of which drives a respective gear 232. The gears 232 each engage the gear wheel 234.

As in the first embodiment the gear wheel 234 is not permanently connected to the gears 232. The gear wheel 234 is retained by a spring-biased locking pin 209 which urges the gear wheel 234 towards the cartridge 216. When it is desired to remove the gear wheel 234 the locking pin is retracted by way of its handle 211, allowing the gear wheel 234 to be slid towards the right as drawn in FIG. 16, until the teeth of the gear wheel 234 become free of the teeth of the gear wheels 231. The gear wheel 234 can thereafter be lifted away from the remainder of the drive mechanism 222.

The possibility to remove the gear wheel 234 permits a reduction in the weight of the drive mechanism. In this second embodiment the drive mechanism may be the heaviest single component and it is desired that no component weigh more than 25 kg. In some embodiments the drive mechanism including the gear wheel 234 will weight more than 25 kg, and so may not be easy to carry for one person. Removing the gear wheel 234 can reduce the weight below 25 kg.

In an alternative embodiment the gears 232 and the gear wheel 234 can be permanently and accurately secured together.

Also, unlike the first embodiment the gears 232 are precisely (or at least almost precisely) diametrically opposed relative to the gear wheel 234, the diametric opposition reducing any unbalanced forces which might otherwise tend to lift the gear wheel 234 and/or move the gear wheel laterally.

In the second embodiment of portable winch assembly 210 the drive from the drive motors 220 is communicated to the magazine 216 wholly by the gears 232, i.e. there is no friction drive in this embodiment (although friction drive is not precluded for modified embodiments). The drive mechanism 222 incorporates guide rollers 230 which in use are engaged by the respective end walls 240 of the magazine 216 as shown in FIG. 15.

The drive motors 220 in the second embodiment are also hydraulic drive motors and are driven by a hydraulic power pack (not shown), in known fashion. Actuation of the hydraulic drive motors 220 causes the gear wheels 232 to rotate (in the same direction), so driving the gear wheel 234 to rotate. Any suitable drive means may be used, and the two motors 220 could be replaced by a single motor (or a set of three or more cooperating motors), if desired. However, two hydraulic drive motors 220, with suitable gearing provided by the diametrically opposed gears 232 and the gear wheel 234, are preferred.

Figure 17:
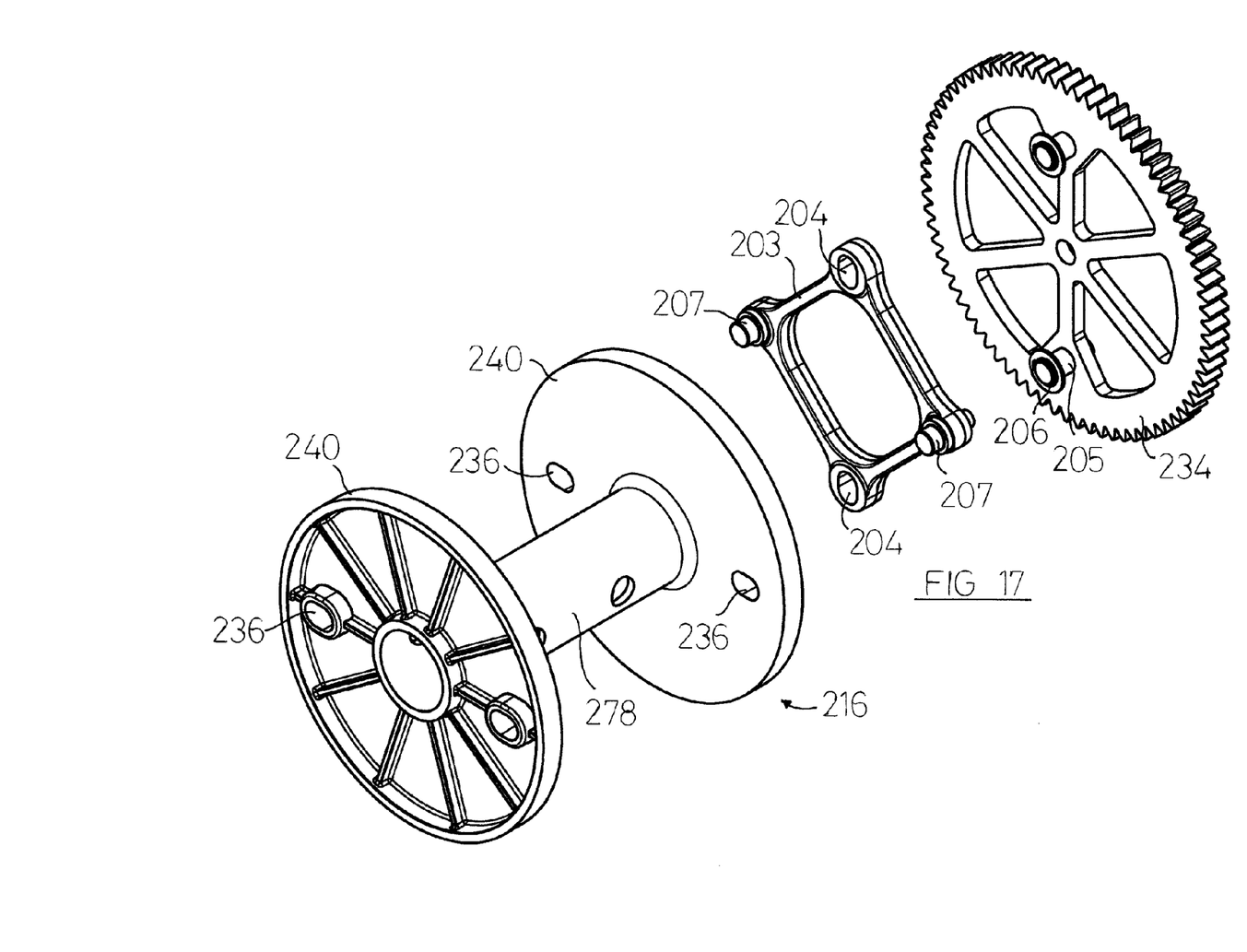
FIG. 17 is a perspective exploded view of the magazine, gear wheel and spider of the second embodiment.

Located between the gear wheel 234 and the magazine 216 is a spider mechanism 203 as better seen in FIG. 17. The spider mechanism 203 has two elongated holes 204 which can accommodate the respective bosses 205 of the gear wheel 234. When configured for use as shown in FIG. 16, the spider mechanism 203 is secured to the gear wheel 234 by way of two washers and circlips 206, which are also shown in their fitted condition in the exploded view of FIG. 17. The spider mechanism 203 has additional bosses 207 which can locate in the elongated holes 236 in the end wall 240 of the magazine 216.

In this embodiment the holes 204, 236 are elongated by 10 mm. It will be understood that the elongated holes 204 and 236 are oriented orthogonally, and so provide up to 10 mm of movement in two perpendicular directions between the gear wheel 234 and the magazine 216. This has advantages in accommodating wear and stresses which occur during use of the portable winch assembly, it being expected that the periphery of the end walls 240 will wear during use. Providing this relative movement between the gear wheel 234 and the magazine 216 avoids the need for any relative movement of the gear wheel 234 relative to the gears 232 (and so permits very tight tolerances to be maintained between the meshing teeth), and yet permits considerable tolerance in the relative positioning of the magazine, making use of the portable winch assembly considerably easier.

To mount the magazine 216 upon the drive mechanism 222 the user retracts the locking pin 209 slightly and moves the gear wheel 234 towards the right as shown in FIG. 16, but with its gear teeth still partially meshing with the teeth of the gears 232. The end walls 240 of the magazine 216 are laid upon the guide rollers 230 with the elongated holed 236 substantially aligned with the bosses 207 of the spider 203. The handle 211 of the locking pin 209 is released, allowing the fitted spring to urge the gear wheel 234 towards the magazine 216, the magazine being rotated slightly if necessary until the bosses 207 enter the elongated holes 236.

The magazine 216 can be constructed similarly to the magazine 16, with a similar clamping mechanism for the cable. However, in many applications it will be possible to avoid a clamping mechanism, and merely pass the end of the cable through the central cylindrical shaft 278 and then bend the cable end to lie along the shaft 278. By rotating the magazine two or more times and winding the cable over its free end the end of the cable can be effectively clamped to the magazine.

Prior to use of the portable winch assembly, the user fits the magazine cover 202, which protects the user from the rotating magazine 216. It will be apparent from FIG. 14 in particular that the user also fits a gear cover 213 which protects the user from the rotating gears 232 and gear wheel 234. The gear cover 213 is separate from the magazine cover 202 in this preferred embodiment, so that the gear cover 213 does not need to be removed when the magazine is to be replaced. In addition, if the user wishes to carry the drive mechanism 222 without removing the gear wheel 234, the gear cover 213 can be left in place during transportation, as well as during removal and replacement of a magazine.

Following use of the portable winch assembly, when the cable has been wound onto the magazine, the (full) magazine can merely be lifted off the support frame. The winch can be used again with a different magazine. If the winch assembly is used to pull a pipe from the ground (as is disclosed in the method of my copending patent application WO2008/071997) then the removed pipe will be wound onto the magazine together with the cable, and will require refurbishment or disposal; a specialised facility can be provided for that.

The invention claimed is:

1. A portable winch assembly (10; 110) comprising a footplate (12; 212), a support frame (14; 214) which is locatable upon the footplate, a magazine (16; 216) which is locatable upon the support frame, and a drive mechanism (22; 222) which is connectable to the magazine to drive the magazine to rotate, the footplate, support frame, magazine and drive mechanism comprising separable components, the magazine having a pair of end walls and a central shaft interconnecting the end walls, the drive mechanism having rollers, the magazine being mounted in the assembled winch by resting the end walls of the magazine upon the rollers, the end walls being rotatable relative to the rollers.

2. The portable winch assembly according to claim 1 in which the footplate (12; 212) has at least one pulley (52; 252).

3. The portable winch assembly according to claim 2 in which, in the assembled winch, the magazine (16; 216) has an axis of rotation and the pulley (52; 252) has an axis of rotation, the axis of rotation of the magazine being substantially perpendicular to the axis of rotation of the pulley.

4. The portable winch assembly according to claim 1 in which the footplate (12; 212) has a recess (54; 254) to receive a part (56; 256) of the support frame.

5. The portable winch assembly according to claim 4 in which the footplate has at least one pulley, and in which a bottom of the recess in the footplate is located below the axle of the at least one pulley (52) in use.

6. The portable winch assembly according to claim 1 in which the drive mechanism includes a gear wheel (34; 234) which can be driven to rotate by at least one motor (20; 220).

7. The portable winch assembly according to claim 6 in which there are two motors (220), each motor being connected to a respective drive gear (232), the two drive gears engaging the gear wheel (234) at substantially diametrically opposed positions.

8. The portable winch assembly according to claim 6 in which, in the assembled winch, the gear wheel (234) is connected to the magazine (216) by way of a spider mechanism (203), the gear wheel (234), spider mechanism (203) and magazine (216) being configured to permit relative radial movement between the gear wheel and the magazine.

9. The portable winch assembly according to claim 8 in which the spider mechanism (203) has two holes (204) and the gear wheel (234) has two bosses (205) adapted to locate in respective holes of the spider mechanism, the bosses (205) each having a respective longitudinal axis, the holes (204) in the gear wheel being elongated in a direction lateral to the respective longitudinal axis.

10. The portable winch assembly according to claim 9 in which, in the assembled winch, the holes (204) of the spider mechanism are laterally elongated along an axis substantially perpendicular to the axis of lateral elongation of the holes (236) of the magazine.

11. The portable winch assembly according to claim 8 in which the magazine (16; 216) has two holes (236) and the spider mechanism has two bosses (207) adapted to locate in respective holes of the magazine/the bosses (207) each having a respective longitudinal axis, the holes (236) in the magazine being elongated in a direction lateral to the respective longitudinal axis.

12. The portable winch assembly according to claim 11 in which, in the assembled winch, the holes (204) of the spider mechanism are laterally elongated along an axis substantially perpendicular to the axis of lateral elongation of the holes (236) of the magazine.

13. The portable winch assembly according to claim 1 in which at least one pulley (201) is located on the support frame.

14. The portable winch assembly according to claim 1 in which the magazine (16; 216) is mountable upon the drive mechanism (22, 222) which in turn is mountable upon the support frame (14; 214), the mounting of the drive mechanism upon the support frame and the mounting of the magazine upon the drive mechanism being maintained by gravity without any fixing means.

15. The portable winch assembly according to claim 1 in which the rollers (24, 26) are driven to rotate.

* * * * *